United States Patent
Kim (10) Patent No.: US 11,721,839 B2
(45) Date of Patent: Aug. 8, 2023

(54) ELECTRODE ASSEMBLY WITH IMPROVED CONNECTION BETWEEN ELECTRODE TABS

(71) Applicant: LG Chem, Ltd., Seoul (KR)

(72) Inventor: Kyung Min Kim, Daejeon (KR)

(73) Assignee: LG Energy Solution, Ltd.

( * ) Notice: Subject to any disclaimer, the term of this patent is extended or adjusted under 35 U.S.C. 154(b) by 282 days.

(21) Appl. No.: 16/765,374

(22) PCT Filed: Mar. 22, 2019

(86) PCT No.: PCT/KR2019/003390
§ 371 (c)(1),
(2) Date: May 19, 2020

(87) PCT Pub. No.: WO2019/245137
PCT Pub. Date: Dec. 26, 2019

(65) Prior Publication Data
US 2020/0343519 A1    Oct. 29, 2020

(30) Foreign Application Priority Data

Jun. 20, 2018  (KR) .................. 10-2018-0071078

(51) Int. Cl.
*H01M 10/0585* (2010.01)
*H01M 50/574* (2021.01)
(Continued)

(52) U.S. Cl.
CPC ... *H01M 10/0585* (2013.01); *H01M 10/4235* (2013.01); *H01M 50/536* (2021.01);
(Continued)

(58) Field of Classification Search
None
See application file for complete search history.

(56) References Cited

U.S. PATENT DOCUMENTS

2005/0079422 A1    4/2005  Ko et al.
2011/0206974 A1*   8/2011  Inoue ............... H01M 4/667
                                                    156/60
(Continued)

FOREIGN PATENT DOCUMENTS

JP    H10188942 A    7/1998
JP    2015130364 A   7/2015
(Continued)

OTHER PUBLICATIONS

International Search Report for Application No. PCT/KR2019/003390 dated Jul. 5, 2019, 2 pages.
(Continued)

*Primary Examiner* — Jonathan Crepeau
(74) *Attorney, Agent, or Firm* — Lerner David LLP (57) ABSTRACT

An electrode assembly having an improved connection structure between electrode tabs includes: an electrode laminate including a plurality of unit cells, each unit cell of the plurality of unit cells formed of a positive electrode having an electrode tab extending from an end thereof, a negative electrode having an electrode tab extending from an end thereof, and a separator disposed between the positive electrode and the negative electrode; and a conductive adhesion portion connecting the electrode tabs of the positive electrode to each other or connecting the electrode tabs of the negative electrode to each other, wherein the conductive adhesion portion includes a safety element material, and wherein the safety element material is applied in the form of a slurry.

20 Claims, 5 Drawing Sheets

(51) Int. Cl.
  *H01M 50/536* (2021.01)
  *H01M 50/581* (2021.01)
  *H01M 10/42* (2006.01)
  *H01M 50/54* (2021.01)
  *H01M 50/534* (2021.01)

(52) U.S. Cl.
  CPC ....... *H01M 50/574* (2021.01); *H01M 50/581* (2021.01); *H01M 50/534* (2021.01); *H01M 50/54* (2021.01); *H01M 2200/00* (2013.01); *H01M 2200/106* (2013.01)

(56) References Cited

U.S. PATENT DOCUMENTS

| | | | |
|---|---|---|---|
| 2012/0189881 A1 | 7/2012 | Geoffroy et al. | |
| 2013/0196182 A1 | 8/2013 | Tanaka et al. | |
| 2014/0335389 A1 | 11/2014 | Takahata | |
| 2017/0237060 A1 | 8/2017 | Inoue et al. | |
| 2017/0279107 A1 | 9/2017 | Yamaoka et al. | |
| 2018/0301762 A1* | 10/2018 | Kwon | H01M 50/107 |

FOREIGN PATENT DOCUMENTS

| | | |
|---|---|---|
| JP | 5880895 B2 | 3/2016 |
| JP | 2016062778 A | 4/2016 |
| JP | 2016081681 A | 5/2016 |
| JP | 2016085849 A | 5/2016 |
| JP | 2017054739 A | 3/2017 |
| KR | 20030075782 A | 9/2003 |
| KR | 20050035074 A | 4/2005 |
| KR | 20120065776 A | 6/2012 |
| KR | 2013-0064228 A | 6/2013 |
| KR | 101616502 B1 | 4/2016 |
| KR | 20170043736 A | 4/2017 |
| KR | 20170068593 A | 6/2017 |
| KR | 20170109070 A | 9/2017 |
| WO | 2016027673 A1 | 2/2016 |

OTHER PUBLICATIONS

Extended European Search Report including Written Opinion for Application No. EP 19822251.5 dated Feb. 22, 2021, pp. 1-10.

* cited by examiner

ELECTRODE ASSEMBLY WITH IMPROVED CONNECTION BETWEEN ELECTRODE TABS

CROSS-REFERENCE TO RELATED APPLICATIONS

This application is a national phase entry under 35 U.S.C. § 371 of International Application No. PCT/KR2019/003390, filed Mar. 22, 2019, published in Korean, which claims priority to and the benefit of Korean Patent Application No. 10-2018-0071078 filed in the Korean Intellectual Property Office on Jun. 20, 2018, the entire contents of both of which are incorporated herein by reference.

TECHNICAL FIELD

The present invention relates to an electrode assembly, and more particularly, it relates to an electrode assembly having an improved connection structure between electrode tabs.

BACKGROUND ART

Recently, as technology development and demand for mobile devices has grown, demands for a rechargeable battery as an energy source have rapidly increased. Accordingly, various researches and studies with respect to a rechargeable battery that can fulfill various needs have been carried out.

The rechargeable battery is attracting much attention as an energy source for power devices such as electric bicycles, electric vehicles, and hybrid electric vehicles as well as mobile devices such as mobile phones, digital cameras, and notebook computers.

Such a rechargeable battery may for example include a nickel cadmium battery, a nickel hydrogen battery, a nickel zinc battery, a lithium rechargeable battery, and the like. Among them, a lithium rechargeable battery has been widely used in the field of high-tech electronic devices because it has almost no memory effect compared with the nickel-based rechargeable battery, is freely charged and discharged, and has a very low self-discharge rate, a high operating voltage, and high energy density per unit weight.

However, when a lithium rechargeable battery is exposed to a high temperature, or a large amount of current flows in a short time due to overcharge, external short circuit, nail penetration, local damage, etc., there is a risk of the battery being heated and occurrence of an explosion. That is, when the pressure or temperature of the battery rises, decomposition reaction of the active material and many side reactions proceed, thereby rapidly raising the temperature of the battery, which further accelerates the reaction between the electrolyte and the electrode. Eventually, a thermal runaway phenomenon occurs in which the temperature of the battery increases sharply, thereby resulting in ignition of the battery, and the lithium rechargeable battery explodes due to the internal pressure of the battery.

Thus, various methods for effective control of a lithium rechargeable battery in an abnormal operation situation such as an overcurrent state, a high-temperature state, and the like have been discussed. A method in which an element may be mounted at an outer side of a cell and a method in which a material is provided inside the cell are used to assure stability. The former includes a positive temperature coefficient (PTC) element that uses a temperature change, a CID element, a protection circuit that controls a voltage and a current, and a stability vent that uses an internal pressure change of a battery, and the latter includes adding a material that can be physically, chemically, or electrochemically changed according to temperature, voltage, and current changes in the battery.

When the method that uses a material inside the cell is performed, no additional installation process is required and it is applicable to all kinds of batteries, but performance of the battery such as a rate characteristic and battery capacity may be deteriorated due to the addition of the material, and operational reliability may not be assured. Thus, various methods that can provide a definite current blocking effect while minimizing battery performance deterioration have been discussed.

DISCLOSURE

Technical Problem

Exemplary embodiments have been made in an effort to provide an electrode assembly for a rechargeable battery, which can implement sufficient battery capacity while assuring stability with respect to overcharge and the like by improving a connection structure between electrode tabs, and a method for manufacturing the same.

However, problems to be solved by exemplary embodiments of the present invention are not limited to the above-mentioned problems, and can be variously expanded within the scope of the technical idea included in the present invention.

Technical Solution

An electrode assembly according to an exemplary embodiment of the present invention includes: an electrode laminate including a plurality of unit cells, each unit cell of the plurality of unit cells formed of a positive electrode having an electrode tab extending from an end thereof, a negative electrode having an electrode tab extending from an end thereof, and a separator disposed between the positive electrode and the negative electrode; and a conductive adhesion portion connecting the electrode tabs of the positive electrode to each other or connecting the electrode tabs of the negative electrode to each other, wherein the conductive adhesion portion includes a safety element material, and wherein the safety element material is applied in the form of a slurry.

The conductive adhesion portion may further include a conductive material and an adhesive material.

The safety element material may include a gas generation material.

A gas may be generated when the gas generation material reaches a decomposition voltage, thereby increasing a volume of the conductive adhesion portion.

The gas generation material may include $Li_2O_3$.

The safety element material may include a positive temperature coefficient material.

The conductive adhesion portion may be a film.

The conductive adhesion portion may be disposed at an end of each electrode tab.

The conductive adhesion portion may be disposed between each pair of neighboring electrode tabs of the positive electrodes, and wherein the conductive adhesion portion is disposed between each pair of neighboring electrode tabs of the negative electrodes.

A topmost electrode tab of the positive electrodes included in the laminate may be welded to one side of an electrode lead.

The conductive adhesion portion may be disposed between a topmost electrode tab of the positive electrodes included in the laminate and one side of an electrode lead.

A topmost electrode tab of the negative electrodes included in the laminate may be welded to one side of an electrode lead.

The conductive adhesion portion may be disposed between a topmost electrode tab of the negative electrodes included in the laminate and one side of an electrode lead.

The conductive adhesion portion may have an area that is the same as an area of the electrode tabs of the positive electrodes.

The conductive material and a material of a current collector of the positive electrode may bee the same.

The conductive material and a material of a current collector of the negative electrode may be the same.

A rechargeable battery according to another exemplary embodiment of the present invention includes the above-described electrode assembly.

Advantageous Effects

According to the exemplary embodiments, an electrode for a rechargeable battery that can ensure safety with respect to an abnormal operation state such as overcharge and the like can be manufactured while not increasing resistance in a normal operation state by including the gas generation material in the conductive adhesive portion between the electrode tabs.

MODE FOR INVENTION

Hereinafter, exemplary embodiments of the present invention will be described in more detail with reference to the accompanying drawings. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification. In addition, the thickness of layers and regions are exaggerated for clarity. In addition, in the drawings, the thickness of some layers and regions are exaggerated for better understanding and ease of description.

It will be understood that when an element such as a layer, film, region, or substrate is referred to as being "on" another element, it can be directly on the other element or intervening elements may also be present. In contrast, when an element is referred to as being "directly on" another element, there are no intervening elements present. The word "on" or "above" means positioned on or above the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, in this specification, the phrase "on a plane" means viewing a target portion from the top, and the phrase "on a cross-section" means viewing a cross-section formed by vertically cutting a target portion from the side.

Figure 1:
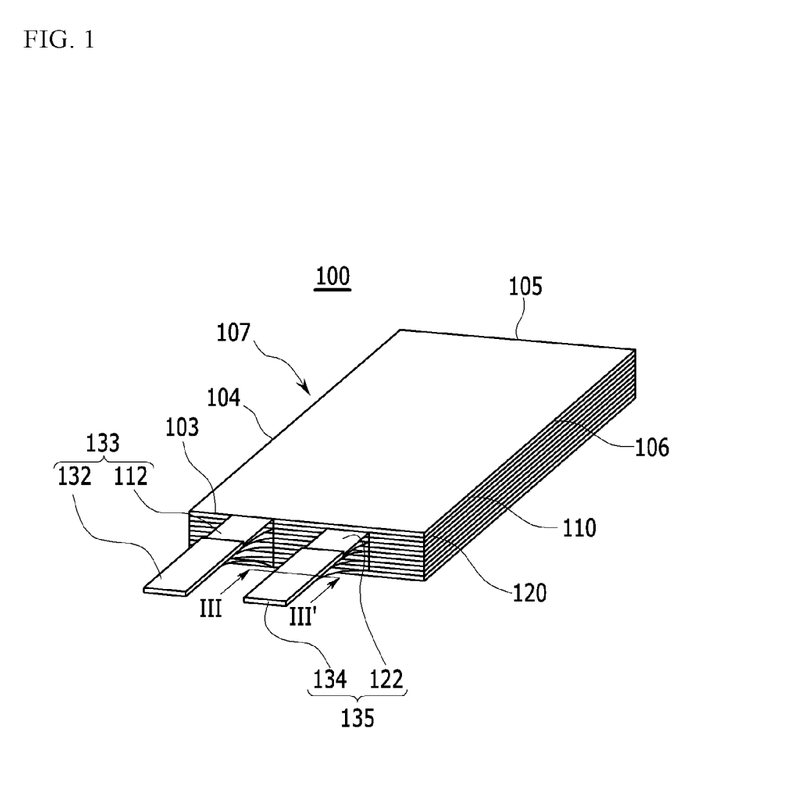
FIG. 1 is a perspective view of an electrode assembly according to an exemplary embodiment of the present invention.
Figure 2:
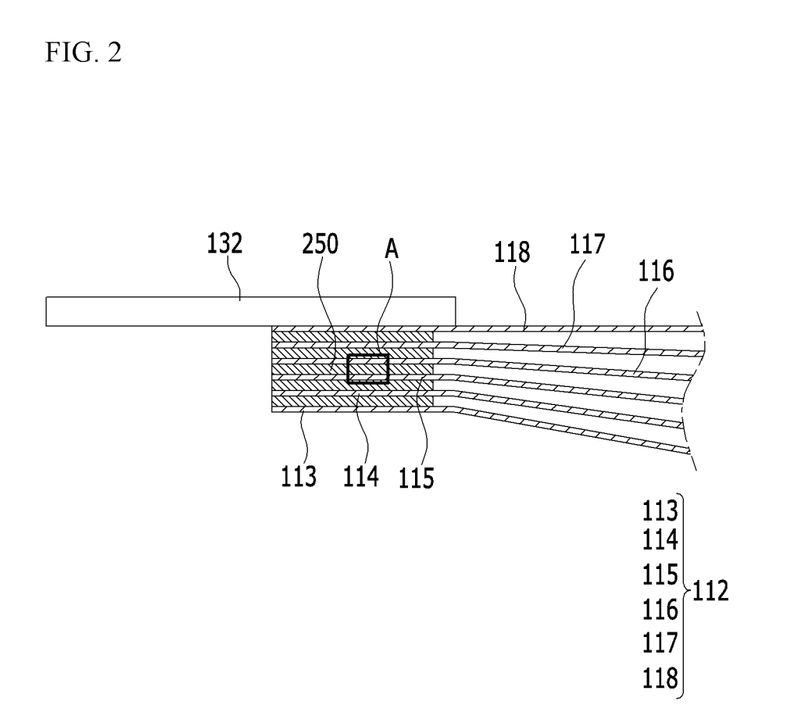
FIG. 2 is a side view of a structure in which electrode tabs of the electrode assembly of FIG. 1 are coupled to an electrode lead.

FIG. 1 is a perspective view of an electrode assembly according to an exemplary embodiment of the present invention. FIG. 2 is a side view of a structure in which electrode tabs of the electrode assembly of FIG. 1 are coupled to an electrode lead.

Referring to FIG. 1 and FIG. 2, an electrode assembly 100 according to the present exemplary embodiment is formed with a structure in which a plurality of first electrode plates 110 and a plurality of second electrode plates 120, having different polarities, are stacked while interposing a separator (not shown) therebetween. That is, the electrode assembly 100 may have a stack-type structure in which the first electrode plates 110, the separator, and the second electrode plates 120 are sequentially stacked.

Here, the first electrode plate 110 may be a positive electrode plate where a positive mixture is applied on an electrode main body, and the second electrode plate 120 may be a negative electrode plate where a negative mixture is applied to an electrode main body. A first electrode tab 112 is formed in each of the first electrode plates 110, and a second electrode tab 122 is formed in each of the second electrode plates 120.

The first electrode plate 110 and the second electrode plate 120 include an electrode main body 107 having a structure that includes first, second, third, and fourth external circumferential sides 103, 104, 105, and 106 formed at four directions in a planar shape. The first electrode tab 112 extends to the outside from the first external circumferential side 103 of the electrode main body 107 of the first electrode plate 110, and the second electrode tab 122 extends to the outside from the first external circumferential side 103 of the electrode main body 107 of the second electrode plate 120. The first electrode tab 112 may be integrally formed with the first electrode plate 110, or may be connected to the first electrode plate 110 by a coupling method such as welding and the like. The second electrode tab 122 may be integrally formed with the second electrode plate 120, or may be connected to the second electrode plate 120 by a coupling method such as welding and the like.

In addition, the first electrode tabs 112 are connected to a first electrode lead 132 and thus form a first terminal 133, and the second electrode tabs 122 are connected to a second electrode lead 134 and thus form a second terminal 135.

In FIG. 2, first electrode tabs 113, 114, 115, 116, 117, and 118 are sequentially stacked, and a conductive adhesion portion 250 is disposed between neighboring first electrode tabs 112. Thus, the neighboring first electrode tabs 112 are attached to each other through the conductive adhesion portion 250 having adhesion rather than by welding. Thus, the neighboring first electrode tabs 112 are electrically connected with each other.

One side of the topmost first electrode tab 118 is coupled to one side of the first electrode lead 132 by contacting the same. In this case, one side of the first electrode lead 132 and one side of the first electrode tab 118 disposed at the topmost may be electrically connected with each other by welding. However, the conductive adhesion portion 250 may be formed between one side of the first electrode lead 132 and one side of the topmost first electrode tab 118 such that the first electrode lead 132 and the first electrode tab 118 can be electrically connected with each other.

The conductive adhesion portion 250 according to the present exemplary embodiment includes a positive temperature coefficient (PTC) material or a gas generation material. This will be described later with reference to FIG. 4 and FIG. 5.

Figure 3:
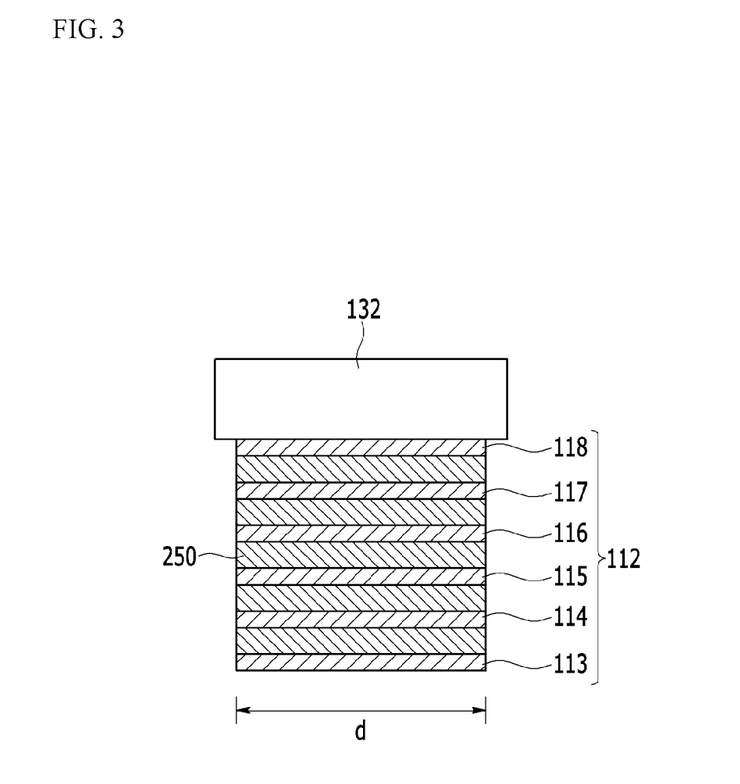
FIG. 3 is a cross-sectional view of FIG. 1, taken along the line III-III'.

FIG. 3 is a cross-sectional view of FIG. 1, taken along the line III-III'.

Referring to FIG. 3, the conductive adhesion portion 250 may have the same shape and width as the first electrode tab 112, which is a width d. It is necessary to derive the length or area of the conductive adhesion portion 250 while satisfying the minimum required adherence. However, in case of a high-powered model, a temperature may be locally increased due to a current concentration when the first electrode tab 112 has a narrow width, and thus the conductive adhesion portion 250 may be formed with an area that is the same as an area of the first electrode tab 112 overlapping one side of the first electrode lead 132 in a vertical direction.

The above-description concerning the conductive adhesion portion 250 and its relationship with the first electrode tabs 112 is the same for the relationship of the conductive adhesion portion 250 with the second electrode tabs 122.

Figure 4:
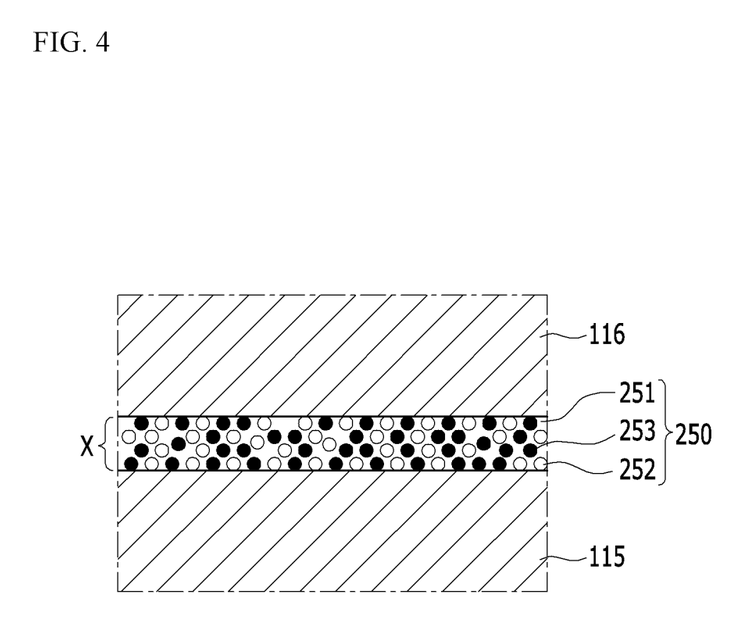
FIG. 4 is an enlarged view of the portion A in FIG. 2.

FIG. 4 is an enlarged cross-sectional view of the portion A in FIG. 2.

Referring to FIG. 4, the conductive adhesion portion 250 includes an adhesive material 251, a conductive material 252, and a gas generation material 253. The adhesive material 251 should not react with an electrolyte solution, and for example, may preferably be an acrylate-based material. The adhesive material 251 may be butyl acrylate/4-hydroxybutyl acrylate=98:2, or ethylhexyl acrylate/acrylic acid=98:2.

Referring to FIG. 1, FIG. 2, and FIG. 4, the first electrode tab 112 may be formed of a metallic material that is the same type as that of a positive electrode current collector. For example, the metallic material may be aluminum. In that case, the conductive material 252 of the conductive adhesion portion 250 that overlaps the first electrode tab 112 is preferably one of aluminum particles, carbon nanotubes (CNT), and carbon black. Particularly, the conductive material 252 is preferably aluminum particles. Thus, a current path formed of an aluminum-based material can be provided between the first electrode tab 112 and the conductive adhesion portion 250 without causing increase of contact resistance. The aluminum particles may be spherical particles.

In FIG. 1, the second electrode tab 122 may be a metallic material that is the same type as a negative electrode current collector. For example, it may be copper. In that case, a conductive material of the conductive adhesion portion in the second electrode tab 122 is preferably one of carbon nanotubes (CNT), carbon black, and copper particles. Particularly, copper particles are preferred. Thereby, a current path formed of a copper-based material can be provided between the second electrode tab 122 and the conductive adhesion portion 250 without causing an increase of contact resistance.

In a normal operation state of the rechargeable battery, the conductive adhesion portion 250 has a level of conductivity at which resistance is not greatly increased due to an electrical path by the conductive material 252 having low resistance compared to a case in which the gas generation material 253 is not included.

The gas generation material 253 is formed of a material that is decomposed when a predetermined voltage is reached such that a gas is generated. Here, the predetermined voltage may be defined as a decomposition voltage for a gas generation material 253 to be decomposed to generate gas.

Figure 5:
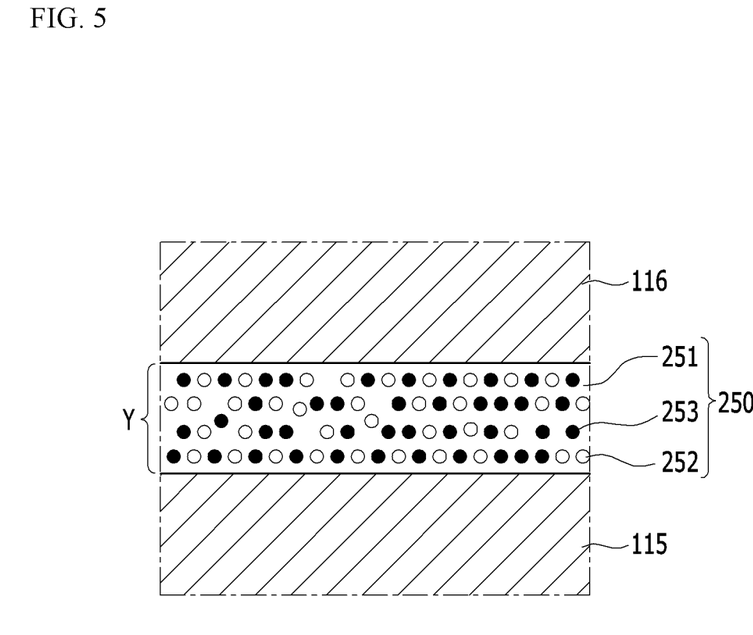
FIG. 5 is an enlarged cross-sectional view of FIG. 4 after gas generation.

FIG. 5 is an enlarged cross-sectional view of FIG. 4 after gas generation.

Referring to FIG. 4 and FIG. 5, the conductive adhesion portion 250 has a first thickness X before reaching the decomposition voltage, but when the decomposition voltage is reached in an abnormal operation state and thus a gas is generated by the gas generation material 253, the volume of the conductive adhesion portion 250 is increased due to the generated gas such that the thickness of the conductive adhesion portion 250 may become a second thickness Y, which is larger than the first thickness X. Depending on the increased volume of the conductive adhesion portion 250, the conductive material 252 moves and thus a distance between the conductive materials 252 is increased. When the distance between the conductive materials 252 is increased, resistance of the conductive adhesion portion 250 is rapidly increased such that resistance and a voltage of a battery cell are increased, thereby reaching an end voltage. The abnormal operation state such as overcharging or overdischarging is terminated through such a process, thereby assuring stability of the rechargeable battery.

The gas generation material 253 may be any material that can generate a gas at the predetermined voltage level. For example, the gas generation material 253 may be $Li_2CO_3$, $K_2CO_3$, $CaCO_3$, $BaCO_3$, $SrCO_3$, and the like. In particular, it is preferred that the gas generation material 253 includes $Li_2CO_3$. When $Li_2CO_3$ is used as the gas generation material 253, $Li_2CO_3$ is decomposed if a voltage applied into the electrode assembly 100 is over 4.7 V to 4.85 V such that CO gas and $CO_2$ gas are generated. Due to the generated CO and $CO_2$ gas, the volume of the conductive adhesion portion 250 is increased. The decomposition voltage may be slightly changed depending on a type of the gas generation material 253, but according to the present exemplary embodiment, the decomposition voltage is preferably 4.5 V or more considering a decomposition voltage of $Li_2CO_3$ (over 4.7 V), $K_2CO_3$ (over 4.5 V), $CaCO_3$ (over 4.8 V), $BaCO_3$ (over 4.9 V), and $SrCO_3$ (over 4.9 V), which can be used as the gas generation material 253.

The conductive adhesion portion formed of the conductive material, the adhesive material, and the gas generation material may be in the form of a slurry applied between the electrode current collector and the electrode tab. Since the conductive adhesion portion is provided in the form of a slurry, a thickness of the conductive adhesion portion can be more simply adjusted, or the amount of the gas generation material in the conductive adhesion portion can be more simply adjusted.

As the amount of the gas generation material is increased, the amount of gas generated due to a predetermined voltage in an abnormal operation state is increased such that the voltage can more quickly reach the end voltage level, and at the same time, the increasing amount of gas may act as resistance in the battery, thereby causing deterioration of battery performance. Thus, the degree of reaching the end voltage with respect to overcharge, overdischarge, and the like and the resistance value of the conductive adhesive portion need to be appropriately adjusted depending on a field where the battery is used. However, in the present exemplary embodiment, the thickness of the slurry is adjusted or the amount of the gas generation material is adjusted to freely adjust the degree of reaching the end voltage with respect to overcharge, overdischarge, and the like and the resistance value of the conductive adhesive portion for each battery to be manufactured without carrying out an additional process, thereby reducing the manufacturing cost of the battery.

In addition, since the conductive adhesive portion is applied in the form of a slurry, the conductive material, the adhesive material, and the gas generation material are dispersed without concentrating in a specific portion, and the end voltage can be effectively secured.

In the present exemplary embodiment, the conductive adhesion portion 250 may have a thickness of about 10 micrometers. In the present exemplary embodiment, the amount of the adhesive material 251 forming the conductive adhesion portion 250 may be fixed to 40%, the amount of the conductive material 252 may be 30 wt % to 50 wt %, and the amount of the gas generation material 253 may be 10 wt % to 30 wt %.

When the gas generation material that is provided for assuring stability with respect to overcharge, external short circuit, nail penetration, local damage, and the like is included in an electrode layer that contains an active material, the amount of active material is reduced by as much as a space occupied by the gas generation material and battery capacity is reduced. Thus, in the present exemplary embodiment of the present invention, the gas generation material is included not in the electrode body but in the conductive adhesion portion 250 disposed between electrode tabs, thereby minimizing battery efficiency deterioration due to reduction of the active material.

The conductive adhesion portion described in the previous exemplary embodiment may have a structure in which the gas generation material is added to the adhesion material and the conductive material, but in an exemplary variation, a PTC material may be included in the conductive adhesion portion instead of the gas generation material. That is, the gas generation material 253 of FIG. 4 may be replaced with a PTC material. Hereinafter, an exemplary embodiment in which a PTC material is included will be described.

A PTC material may be formed of a material of which resistance is rapidly increased as a temperature in the battery is increased. When the temperature in the battery is increased due to abnormal operating conditions such as overcharge or overdischarge, the resistance of the PTC material contained in the conductive adhesion portion increases rapidly due to the increased temperature. Due to the resistance increase of the conductive adhesion portion, the battery ultimately reaches the end voltage, ensuring the stability of the rechargeable battery for abnormal operating conditions.

The PTC material can be formed of any material of which resistance is rapidly increased according to a temperature increase. For example, the PTC material may be made of a silicon rubber or polyethylene.

The conductive adhesion portion formed of the adhesive material, the conductive material, and the PTC material may be applied in the form of a slurry between an electrode current collector and an electrode tab. Since the conductive adhesion portion is provided in the form of a slurry, the thickness of the conductive adhesion portion can be more easily adjusted, or the content of the PTC material in the conductive adhesion portion can be adjusted.

As the content of the PTC material is increased, resistance is more rapidly increased in an abnormal operation state such that the battery promptly reaches the termination voltage, and at the same time, the PTC material acts as resistance in the battery, thereby deteriorating performance of the battery. It is necessary to properly adjust the amount of PTC material depending on the field where the battery is used, and in the present exemplary embodiment, it is possible to freely adjust the degree of reaching the end voltage with respect to overcharge, overdischarge, and the like and the resistance value of the conductive adhesion portion, regardless of the battery to be manufactured, by adjusting the slurry thickness or the content of the PTC material, thereby reducing manufacturing cost of the battery.

In addition, since an operation temperature is predetermined in case of a conventional PTC element, there is a problem that a manufacturing process is complicated and manufacturing cost is increased because the element needs to be manufactured differently when the operation temperature of the PTC is different for each battery to be manufactured. However, in the exemplary embodiment of the present invention, a PTC operation temperature can be more simply adjusted by adjusting the slurry thickness or the content of the PTC material.

In addition, since the conductive adhesion portion is coated in the form of a slurry, the adhesive material, the conductive material, and the PTC material can be evenly dispersed rather than being concentrated to a specific portion, and accordingly, the electrical conductivity, the degree of adhesion, and the degree of reaching the termination voltage can be effectively assured.

As described, in addition to the exemplary embodiment, which is related to the conductive adhesion portion including the PTC material, the above description related to the conductive adhesion portion that includes the gas generation material is applicable to the present exemplary embodiment.

As described above, according to the exemplary embodiments of the present invention, since the connection structure between the electrode tabs is improved, a rechargeable battery that can minimize a limitation in battery capacity while assuring stability with respect to the abnormal operation situation such as overcharge and external short circuit can be manufactured. In particular, in the high output model where the number of electrode tabs increases, the effect of current blocking and improvement of battery capacity becomes more apparent.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

100: electrode assembly
250: conductive adhesion portion
251: adhesive material
252: conductive material
253: gas generation material

The invention claimed is:
1. An electrode assembly comprising:
an electrode laminate including a plurality of unit cells, each unit cell of the plurality of unit cells formed of a positive electrode having an electrode tab extending from an end thereof, a negative electrode having an electrode tab extending from an end thereof, and a separator disposed between the positive electrode and the negative electrode; and a conductive adhesion portion that is disposed between all of a plurality of adjacent electrode tabs of the positive electrode and all of a plurality of adjacent electrode tabs of the negative electrode, and connecting the electrode tabs of the positive electrode to each other or connecting the electrode tabs of the negative electrode to each other, wherein the conductive adhesion portion includes a conductive material, an adhesive material, and a safety element material, wherein the safety element material is applied in the form of a slurry, wherein the safety element material includes a gas generation material, wherein a gas is generated when the gas generation material reaches a decomposition voltage, thereby increasing a volume of the conductive adhesion portion, and wherein the gas generation material is $Li_2CO_3$, $K_2CO_3$, $CaCO_3$, $BaCO_3$, or $SrCO_3$, wherein a topmost electrode tab of the positive electrodes included in the laminate is welded to one side of an electrode lead.

2. The electrode assembly of claim 1, wherein the decomposition voltage is 4.5 V or more.

3. The electrode assembly of claim 1, wherein the gas generation material includes $Li_2CO_3$.

4. The electrode assembly of claim 1, wherein the safety element material includes a positive temperature coefficient material.

5. The electrode assembly of claim 1, wherein the conductive adhesion portion is a film.

6. The electrode assembly of claim 1, wherein the conductive adhesion portion is disposed at an end of each electrode tab.

7. A rechargeable battery comprising the electrode assembly of claim 1.

8. The electrode assembly of claim 1, wherein the conductive adhesion portion has an area that is the same as an area of the electrode tabs of the positive electrodes.

9. The electrode assembly of claim 1, wherein the conductive material and a material of a current collector of the positive electrode are the same.

10. The electrode assembly of claim 1, wherein the conductive material and a material of a current collector of the negative electrode are the same.

11. An electrode assembly comprising:
an electrode laminate including a plurality of unit cells, each unit cell of the plurality of unit cells formed of a positive electrode having an electrode tab extending from an end thereof, a negative electrode having an electrode tab extending from an end thereof, and a separator disposed between the positive electrode and the negative electrode; and a conductive adhesion portion that is disposed between all of a plurality of adjacent electrode tabs of the positive electrode and all of a plurality of adjacent electrode tabs of the negative electrode, and connecting the electrode tabs of the positive electrode to each other or connecting the electrode tabs of the negative electrode to each other, wherein the conductive adhesion portion includes a conductive material, an adhesive material, and a safety element material, wherein the safety element material is applied in the form of a slurry, wherein the safety element material includes a gas generation material, wherein a gas is generated when the gas generation material reaches a decomposition voltage, thereby increasing a volume of the conductive adhesion portion, and wherein the gas generation material is $Li_2CO_3$, $K_2CO_3$, $CaCO_3$, $BaCO_3$, or $SrCO_3$, wherein a topmost electrode tab of the negative electrodes included in the laminate is welded to one side of an electrode lead.

12. The electrode assembly of claim 11, wherein the decomposition voltage is 4.5 V or more.

13. The electrode assembly of claim 11, wherein the gas generation material includes $Li_2CO_3$.

14. The electrode assembly of claim 11, wherein the safety element material includes a positive temperature coefficient material.

15. The electrode assembly of claim 11, wherein the conductive adhesion portion is a film.

16. The electrode assembly of claim 11, wherein the conductive adhesion portion is disposed at an end of each electrode tab.

17. A rechargeable battery comprising the electrode assembly of claim 11.

18. The electrode assembly of claim 11, wherein the conductive adhesion portion has an area that is the same as an area of the electrode tabs of the positive electrodes.

19. The electrode assembly of claim 11, wherein the conductive material and a material of a current collector of the positive electrode are the same.

20. The electrode assembly of claim 11, wherein the conductive material and a material of a current collector of the negative electrode are the same.

* * * * *